(12) United States Patent
VanBlon et al.

(10) Patent No.: US 11,108,709 B2
(45) Date of Patent: Aug. 31, 2021

(54) PROVIDE STATUS MESSAGE ASSOCIATED WITH WORK STATUS

(71) Applicant: Lenovo (Singapore) Pte. Ltd., Singapore (SG)

(72) Inventors: Russell Speight VanBlon, Raleigh, NC (US); Robert James Kapinos, Durham, NC (US); Timothy Winthrop Kingsbury, Cary, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 194 days.

(21) Appl. No.: 15/605,201

(22) Filed: May 25, 2017

(65) Prior Publication Data
US 2018/0343212 A1 Nov. 29, 2018

(51) Int. Cl.
*H04L 12/58* (2006.01)
*H04L 29/08* (2006.01)
*G06Q 10/10* (2012.01)

(52) U.S. Cl.
CPC ............ *H04L 51/02* (2013.01); *G06Q 10/10* (2013.01); *H04L 51/14* (2013.01); *H04L 67/24* (2013.01); *H04L 67/02* (2013.01)

(58) Field of Classification Search
CPC ..................................................... H04L 51/02
See application file for complete search history.

(56) References Cited

U.S. PATENT DOCUMENTS

| | | | | |
|---|---|---|---|---|
| 5,960,173 A * | 9/1999 | Tang | .......................... | G06F 9/54 348/14.08 |
| 7,311,608 B1 * | 12/2007 | Danieli | .................... | A63F 13/12 463/42 |
| 2003/0046296 A1 * | 3/2003 | Doss | ......................... | H04L 51/04 |
| 2007/0143472 A1 * | 6/2007 | Clark | ........................ | H04L 43/00 709/224 |
| 2010/0299615 A1 * | 11/2010 | Miluzzo | ................... | H04W 4/02 715/752 |
| 2011/0099254 A1 * | 4/2011 | Vankadara | ............ | G06Q 10/107 709/221 |
| 2012/0264446 A1 * | 10/2012 | Xie | .......................... | G01C 22/00 455/456.1 |
| 2013/0218845 A1 * | 8/2013 | Kleppner | ................ | G06F 16/176 707/687 |
| 2014/0049462 A1 * | 2/2014 | Weinberger | ............. | G06F 3/013 345/156 |
| 2014/0180983 A1 * | 6/2014 | Deng | ........................ | G06N 3/02 706/15 |
| 2015/0100524 A1 * | 4/2015 | Pantel | .................. | G06F 3/04842 706/12 |
| 2016/0228774 A1 * | 8/2016 | Levi | ....................... | A63F 13/795 |
| 2016/0314318 A1 * | 10/2016 | Li | .......................... | G06Q 10/107 |

* cited by examiner

*Primary Examiner* — Andrew C Georgandellis
(74) *Attorney, Agent, or Firm* — Ference & Associates LLC

(57) ABSTRACT

One embodiment provides a method, including: receiving, at an information handling device, an incoming communication; accessing, using a processor, context data associated with a user, wherein the context data corresponds to at least one active application; determining, using the context data, a work status of the user; and providing, responsive to the incoming communication, a status message associated with the determined work status. Other aspects are described and claimed.

4 Claims, 3 Drawing Sheets

PROVIDE STATUS MESSAGE ASSOCIATED WITH WORK STATUS

BACKGROUND

Users may configure messaging applications (e.g., email applications, text messaging applications, social media applications, etc.) disposed on information handling devices ("devices"), for example smart phones, tablet devices, laptop computers, smart speakers, and the like, to provide an automatic response to any received message. For example, a user working on a task may update their status to "Busy" or "Do Not Disturb". A sender of an incoming communication may either view this status prior to sending the message, or, alternatively, may receive the preconfigured response subsequent to sending the user a message.

BRIEF SUMMARY

In summary, one aspect provides a method, comprising: receiving, at an information handling device, an incoming communication; accessing, using a processor, context data associated with a user, wherein the context data corresponds to at least one active application; determining, using the context data, a work status of the user; and providing, responsive to the incoming communication, a status message associated with the determined work status.

Another aspect provides an information handling device, comprising: a processor; a memory device that stores instructions executable by the processor to: receive an incoming communication; access context data associated with a user, wherein the context data corresponds to at least one active application; determine, using the context data, a work status of the user; and provide, responsive to the incoming communication, a status message associated with the determined work status.

A further aspect provides a product, comprising: a storage device that stores code, the code being executable by a processor and comprising: code that receives an incoming communication; code that accesses context data associated with a user, wherein the context data corresponds to at least one active application; code that determines, using the context data, a work status of the user; and code that provides, responsive to the incoming communication, a status message associated with the determined work status.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
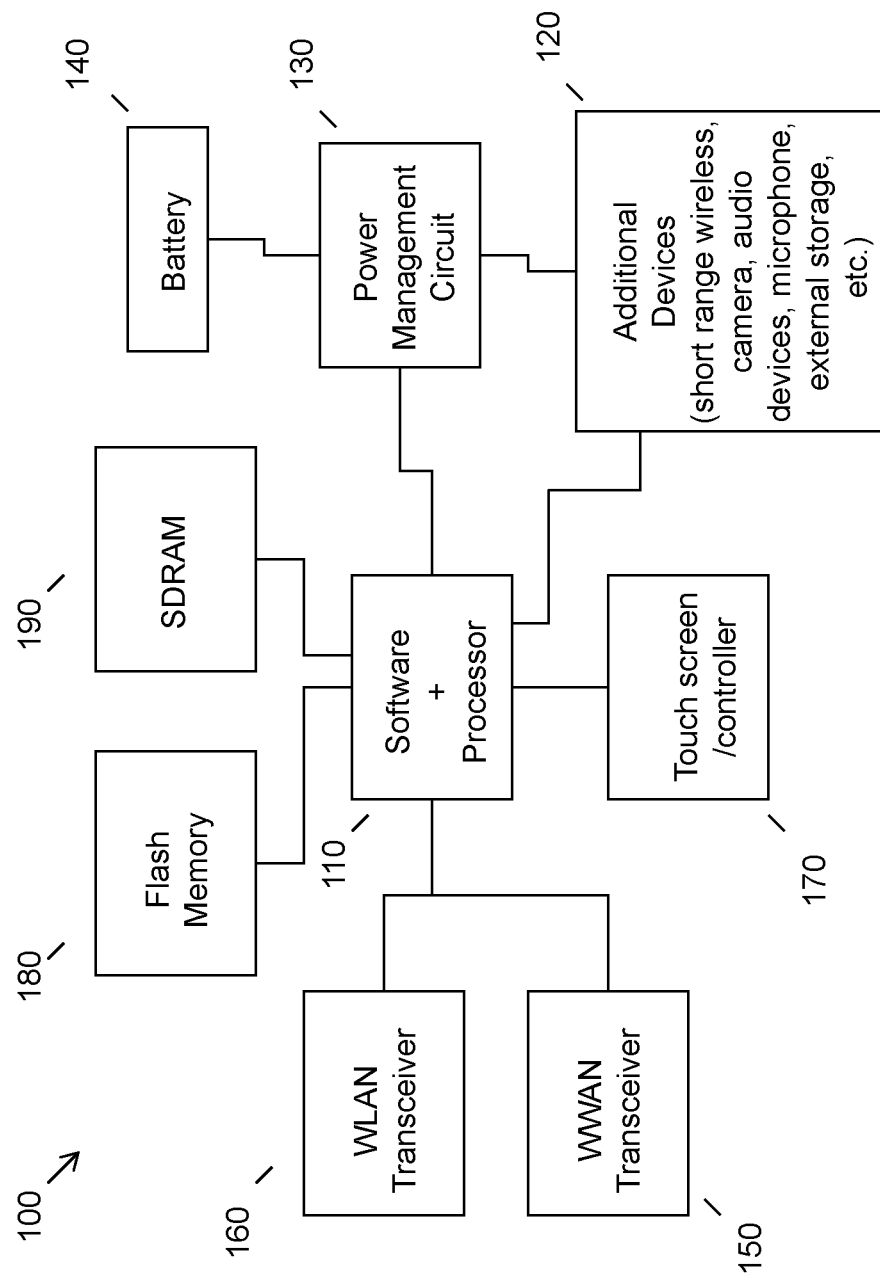
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users of messaging applications (e.g., email applications, text messaging applications, social media applications, etc.) frequently utilize preconfigured status messages to alert other users, or message senders, of their current work status. These status messages are usually short phrases that may provide an indication of where a user currently is, whether they are free or busy, what activity they are engaged in, how long they may be engaged in the activity, etc. For example, a user engrossed in a work matter may not want to be bothered by any communications so he/she may update their status to "Busy". In some cases the user may be able to make a custom status, for example, a user engaged in a company meeting may update their status message to identify the period of time they will be preoccupied by the meeting, e.g., "Board Meeting (10 am-11 am)".

Alternatively, many messaging systems will update the status of a user based upon a detected activity. For example, the system may determine that a user has not interacted with the system for a predetermined length of time and may change the user's status to "Away". As another example, the system may identify that a user is in a meeting based upon a calendar appointment in the user's calendar and may change the user's status to "Busy."

Conventionally, these status messages allow other individuals to attain a rough idea of the general status of the user. However, these methods fail to provide a more detailed description of the user's work status. For example, while a user's message status may say "Busy," another individual may not know what the user is busy with (e.g., busy with work, busy with family, etc.) and may therefore not know whether or not it would be appropriate to contact the user. Additionally, because many traditional methods require a user to manually update their status message, if the user forgets to update their message then other users may not be provided with the most up-to-date work status information. This may have a negative impact on company workflow and/or may confuse other individuals.

Existing solutions allow a user to configure a system to provide automatic status messages at predefined intervals (e.g., daily, weekly, etc.) for recurring events. For example, a user may have a weekly company meeting on Tuesdays at 11 am. They may configure the system to automatically update their status message to "Company Meeting Until 11:30 am" each Tuesday at 11 am. However, a user may not always abide by their anticipated schedule. For example, using the aforementioned example, the user's weekly meeting may have been cancelled or postponed to another time. In such a situation, the user may actually be free to contact between 11 am to 11:30 am, however, because the system abides by the status schedule the user configured, it still updates the status message to "Company Meeting Until 11:30 am". Additionally, in the same vein, if the meeting is postponed to a later time on Tuesday, then the system may not know to provide a status message for that new meeting time. A potential effect of this may be that other individuals may contact the user thinking that the user is free when the user is actually participating in the postponed meeting.

Accordingly, an embodiment may provide a method for determining a user's current work status and subsequently providing a status message associated with that work status. In an embodiment, a message or communication designated to a user may be received at a device. An embodiment may access context data associated with the user, wherein the context data corresponds to at least one active application open on the device. An embodiment may then determine a work status of the user by analyzing characteristics of the active application and provide, as a response to the incoming communication, a status message associated with the user's work status. Such a method enables individuals who contact a user to be apprised of a more detailed description of the user's activity rather than just receive a conventional and non-descript default status message (e.g., Busy, Away, etc.).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
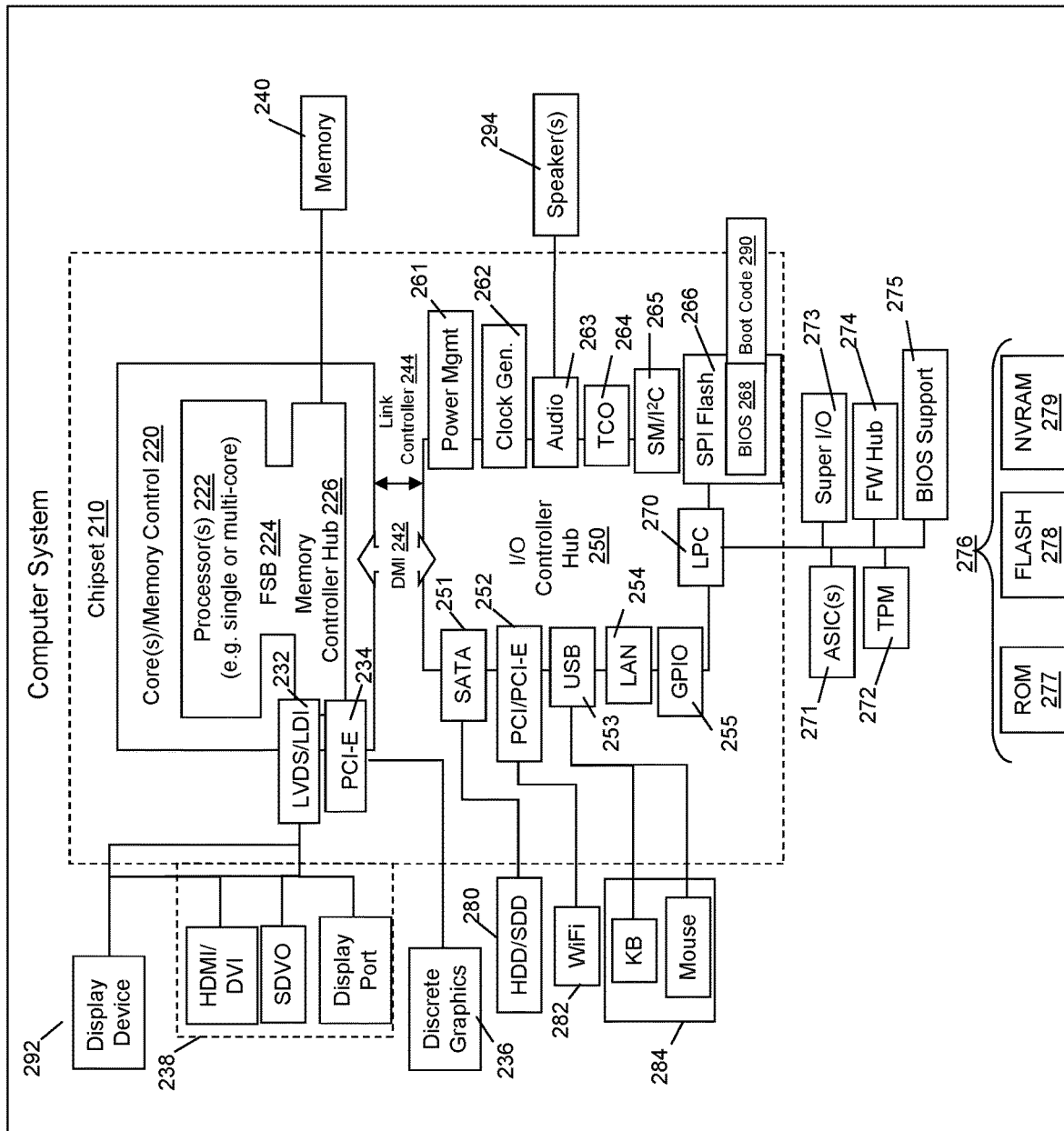
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which a user may use and may include communication applications that provide a status of the user. For example, the circuitry outlined in FIG. 1 may be implemented in a tablet or smart phone embodiment, whereas the circuitry outlined in FIG. 2 may be implemented in a personal computer embodiment.

Figure 3:
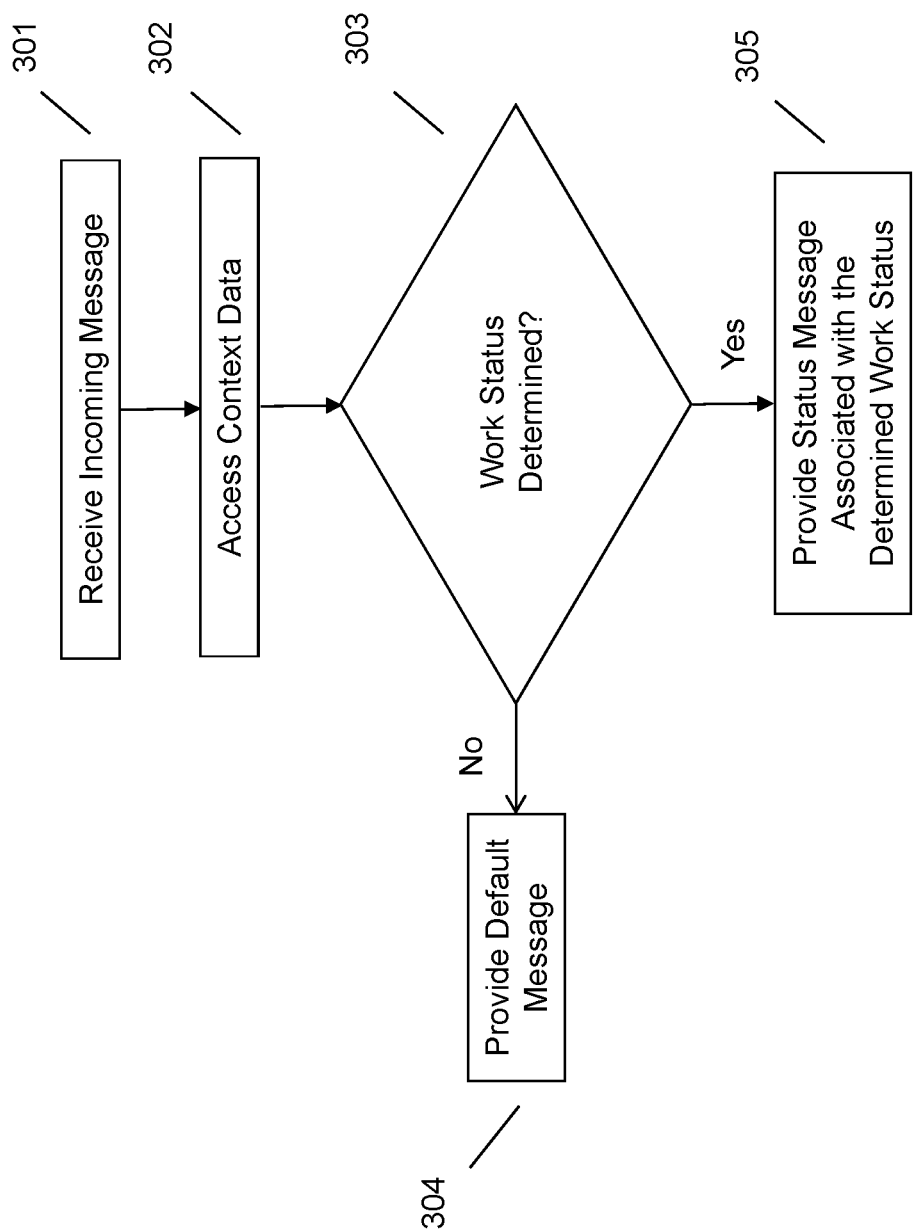
FIG. 3 illustrates an example method of updating a status message based upon a determined work status.

Referring now to FIG. 3, an embodiment may provide methods for responding to an incoming communication. At 301, an embodiment may receive an incoming communication. The incoming communication may be sent from another individual to the user and may be a text message, an email message, a voice message, an instant message, and the like. In an embodiment, the message may be received by an active application employed by the user's device such as a text messaging application, a social media application, an email application, a phone application, and the like. Alternatively, the incoming communication may not be a sent message, but rather an indication that a user wants to contact another user. In other words, the system may detect when another user has selected a user for contacting. For example, one user may select another user for contact through an instant messaging application. Once the user has been selected the system may query the user's system to determine the status of the user. The query may be treated as an incoming communication.

At 302, an embodiment may access context data associated with a user. In an embodiment, the context data may be associated with at least one active application open on the device such as a web-browsing application, a word processing application, an email application, a media playing application, an application associated with a sensor disposed on the device (e.g., a microphone, a camera, etc.), and the like. An application may be considered active, for example, if a cursor is placed inside of the application or a user is performing functions (e.g., typing, clicking, scrolling, providing vocal or visual input, etc.) inside of or to the application. Alternatively, an application may also be considered active by simply being open, regardless of whether a user is performing functions inside of the application and/or regardless of whether the application window is expanded or minimized.

At 303, an embodiment may determine if a work status of the user can be determined. The work status of the user of the user may be determined using the context data. The work status of the user may refer to a description of how busy a user is, what they are working on, how long they have been working for, a combination thereof, etc. If a work status cannot be determined at 303, an embodiment may provide a default status message at 304. However, if a work status can be determined at 303, an embodiment may provide, at 305, a status message associated with the determined work status. In an embodiment, the status message may describe at least one aspect of the user's work status. The work status of a user and corresponding status message may be determined and provided by utilizing some, or all, of the following methods and examples.

In an embodiment, the work status may be determined by identifying an application type associated with the active application. In this context, the application type may refer to a generalized function of the application (e.g., a word-processing application, a media playing application, an internet browsing application, etc.). Alternatively, or in addition to, the application type may refer to the name of the application itself (e.g., Microsoft Excel®, Internet Explorer®, Netflix®, etc.). The application type may be determined, for example, by identifying any metadata associated with the application that identifies the application name or what the application does. Other methods for determining the application type that are not listed here may also be used. Responsive to determining the work status of the user by identifying the application type, an embodiment may provide, or update, a corresponding status message. For example, responsive to determining that a user is working in a specific word-processing application, such as Microsoft Word®, an embodiment may update the status message to "User A is busy working on Document A in Microsoft Word".

In an embodiment, the work status may be determined by identifying the content included in the active application. In this context, application content may refer to the type of data present in the application (e.g., text data, image data, video data, voice data received by the application, etc.). Additionally, application content may also refer to a title of a document itself or subtitles of sections within the document. In an embodiment, the content of the application may be determined, for example, by identifying any metadata associated with the application. For example, metadata may be attached to a particular document that identifies the document as a text document as opposed to a video document. In another example, metadata may also be attached to an application that identifies a document title (e.g., Appeal Brief for Client X, etc.).

Alternatively, or in addition to, an embodiment may determine the content of the application by identifying the presence and/or abundance of media files, images, words, etc. associated with the application. For example, an embodiment may determine that a user is viewing a media playing application rather than working in a word document by identifying that the application primarily contains moving video images and few words. Other methods for determining the application content that are not listed here may also be used. Responsive to determining the work status of the user by identifying the content associated with the application, an embodiment may provide, or update, a corresponding status message. For example, responsive to determining that an application contains primarily video data, an embodiment may update the user's status message to "User A is engaged with a media playing application". Alternatively, responsive to identifying specific sections within an application, an embodiment may provide a more specific status message such as "User A is currently working on the Arguments Section of the Appeal Brief for Client X".

In an embodiment, the work status may be determined by identifying a length of activity in the active application. In this context, the length of activity may refer to how long a user has interacted with a particular application. For example, an embodiment may determine that a user has interacted with a particular active application for one hour. In an embodiment, certain designations may be assigned to different activity lengths. For example, if a user has only interacted with an application for a brief time (e.g., a few seconds to a couple minutes, etc.) an embodiment may determine that a user has only just begun working in that application and provide a status message that is reflective of this activity length, such as "User A has just begun working in application B."

Alternatively, or in addition to, if an embodiment determines that a user has interacted with an application for a long period of time, an embodiment may determine that a user is deep in their work and provide a message status that emphasizes this point, such as "User A is very busy working on application B." In an embodiment, a status message may be dynamically updated to a default status message by identifying that there has been a predetermined length of inactivity in one or any of the active applications. For example, responsive to determining that a user has not provided any inputs to any of the active applications for 15 minutes, an embodiment may update the status message to a default message such as "User A has been inactive for X amount of time".

In an embodiment, the work status may be determined by identifying a designation of one or more active applications. The designation may refer to a context associated with an application (e.g., a work-based application, a home or leisure-type application, etc.). In an embodiment, the designation may be a predefined user-provided designation associated with different types of applications. For example, a user may designate all word-processing applications as being associated with a work context and all media-playing applications as being associated with a home, or leisure, context.

In an embodiment, the designations for the applications may also be updated and assigned dynamically. For instance, in an embodiment, application designations may be based upon where and/or when they are accessed. For example, GPS data may be utilized to determine that a user is interacting with an active application on a device at a work location. Responsive to determining that the application is active at the work location, the application is designated as a work-based application. Conversely, if an embodiment detects (e.g., using GPS data, etc.) that the user accesses the same application at a home location, the designation may switch to a home context. In the same vein, if an application is accessed during conventional work hours (e.g., 8 am-5 pm, etc.) an embodiment may determine that it should be associated with a work context. Alternatively, if the same application is accessed during off-work hours (e.g., early morning or after 5 pm, etc.) an embodiment may determine that the application is associated with a non-work context.

Responsive to determining the context of the application, an embodiment may provide a corresponding message. For example, responsive to determining that the application is associated with a work-based context, an embodiment may provide a status message such as "User A has been interacting with a work-based application for 30 minutes". A similar status message may be provided for applications determined to be leisure-related.

In an embodiment, the work status may be determined by identifying a current position in an active application. In an embodiment, the current position may refer to a cursor position within the application (e.g., a cursor positioned as the top of the page vs. the bottom of the page, etc.). In another embodiment, the current position may be identified, for example, by identifying a location of the user's gaze (e.g., by utilizing one or more cameras, etc.). For example, an embodiment may identify that a user is reading the text at the bottom of a document as opposed to the middle or top of the document. Responsive to identifying the user's position, an embodiment may update the status message accordingly. For example, an embodiment may identify that a user has just opened a document and begun reading it. Responsive to identifying a user's early position in the document, an embodiment may provide a status message such as "User A is reading a document and is currently at the beginning of the document".

In an embodiment, the status message may be immediately sent back to the user responsive to receiving the incoming communication. For example, responsive to receiving the message "Do you have a moment to talk?" an embodiment may send a status message back to the sender stating "Dave is busy working on a work-related spreadsheet in Microsoft Excel". Alternatively, in another embodiment, the status message may be continuously on display and visible to potential message senders. For example, for a user utilizing a text messaging application, the status message may be visible to the sender as an icon next to the user's text messaging username. In another example, for a user utilizing an email application, potential senders may see the status message prior to sending the email by just entering the user's contact email into the application or by selecting the user to send an email to. In yet a further example, the status message may appear on a user's calendar so that any viewers having access to the user's calendar may see the status message. In yet a further example, the status message may be an audible message, such as a voicemail greeting, that may play responsive to receiving a vocal message (e.g., a call, etc.) from a sender.

The various embodiments described herein thus represent a technical improvement to conventional status message updating techniques. Using the techniques described herein, an embodiment may determine a work status of a user by accessing context data associated with active applications open on a user's device. An embodiment may then dynamically provide a corresponding status message reflective of the user's current work status. Such an embodiment enables other individuals to be apprised of the most up to date work status of the user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, an incoming communication;
identifying, using a processor a user's position within an active document, wherein the active document is identified using at least one sensor selected from at least one of a camera and a microphone;
determining, based upon the user's position within the active document and upon inputs received by the at least one sensor, a work status of the user, wherein the determining comprises:
identifying that the work status is a not busy work status responsive to identifying that the user's position is at the beginning of the active document; and
providing a response to the incoming communication, wherein the response includes a description of the work status comprising an indication of the position within the active document.

2. The method of claim 1, further comprising updating the response based upon a change in the determined work status.

3. An information handling device, comprising:
at least one camera;
a processor;
a memory device that stores instructions executable by the processor to:
receive an incoming communication;
identify, using the processor the at least one camera, a user's position within an active document, wherein the active document is identified using at least one sensor selected from at least one of a camera and a microphone;
determine, based upon the user's position within the active document and upon inputs received by the at least one sensor, a work status of the user, wherein the instructions executable by the processor to determine comprise instructions executable by the processor to:
identify that the work status is a not busy work status responsive to identifying that the user's position is at the beginning of the active document; and
provide a response to the incoming communication, wherein the response includes a description of the work status and comprises an indication of the position within the active document.

4. A product, comprising:
a storage device that stores code, the code being executable by a processor and comprising:
code that receives an incoming communication;
code that identifies a user's position within an active document, wherein the active document is identified using at least one sensor selected from at least one of a camera and a microphone;
code that determines, based upon the user's position within the active document and upon inputs received by the at least one sensor, a work status of the user, wherein the code that determines comprises code that:
identifies that the work status is a not busy work status responsive to identifying that the position is at the beginning of the active document; and
code that provides a response to the incoming communication, wherein the response includes a description of the work status comprising an indication of the position within the active document.

* * * * *